No. 860,610. PATENTED JULY 16, 1907.
C. P. SESTER.
SEEDING MACHINE.
APPLICATION FILED FEB. 8, 1906.
3 SHEETS—SHEET 1.
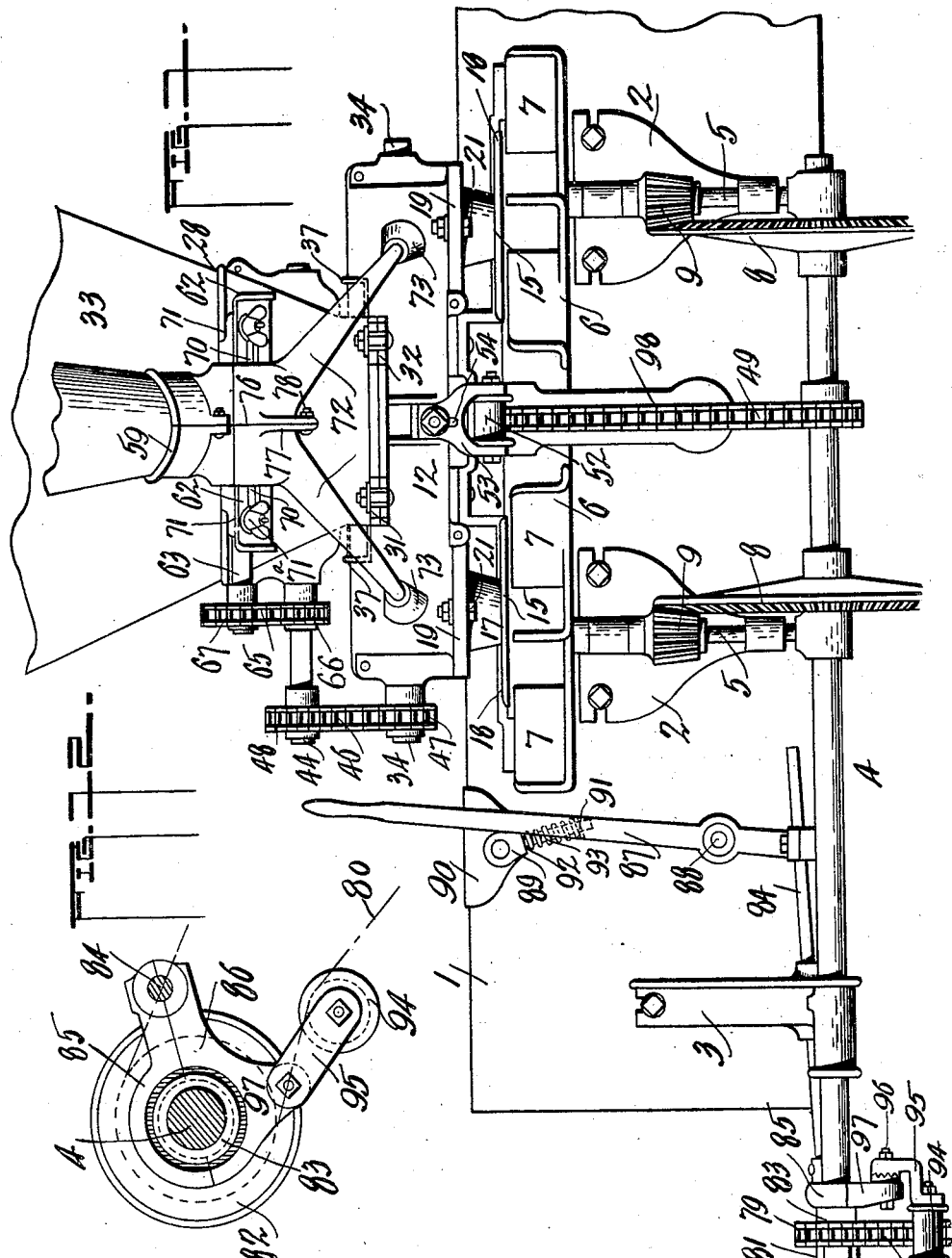
Witnesses:-
Inventor.
Charles P. Sester
By 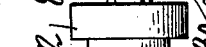 Atty.

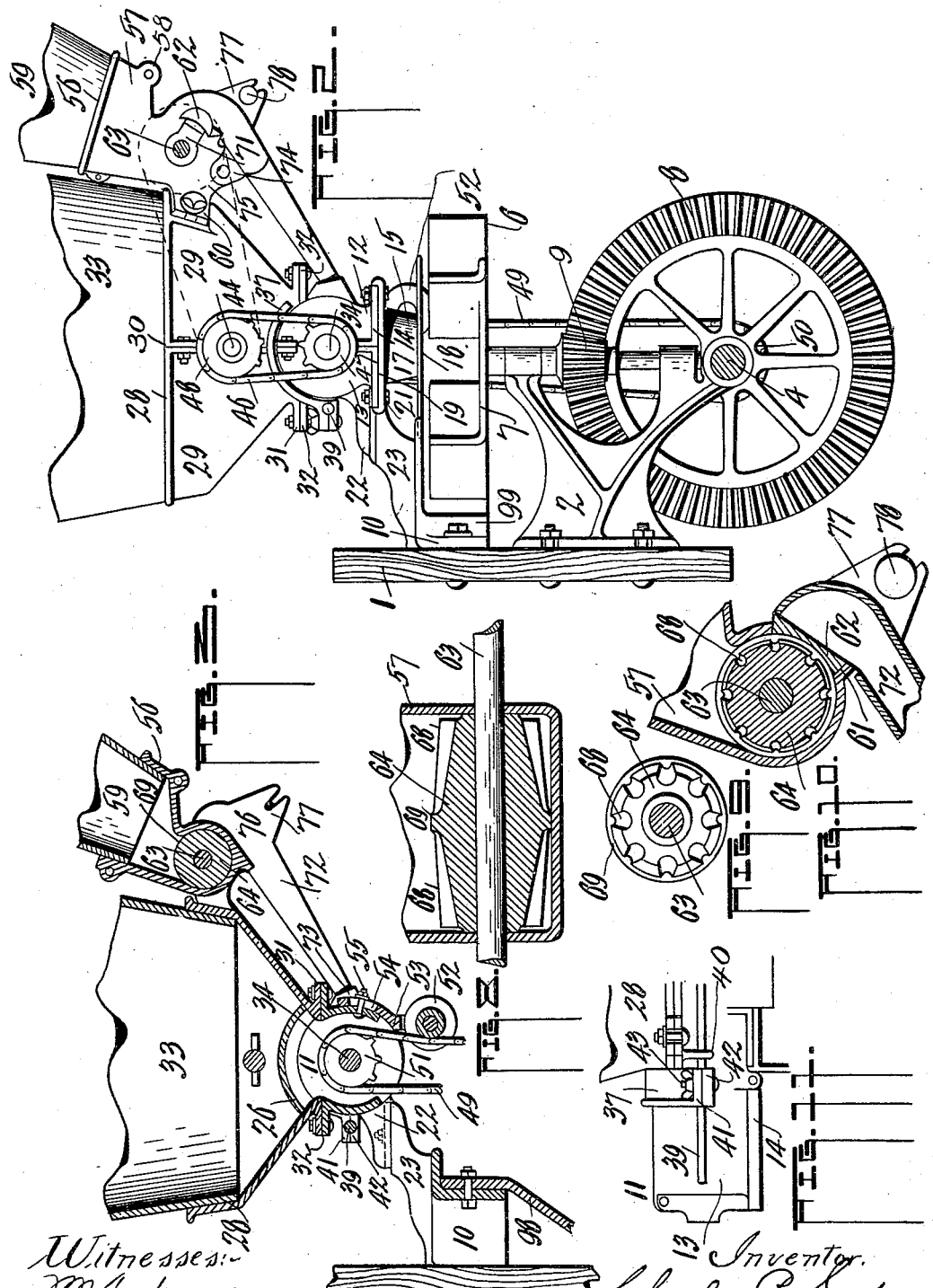

No. 860,610.
PATENTED JULY 16, 1907.
C. P. SESTER.
SEEDING MACHINE.
APPLICATION FILED FEB. 8, 1906.
3 SHEETS—SHEET 3.
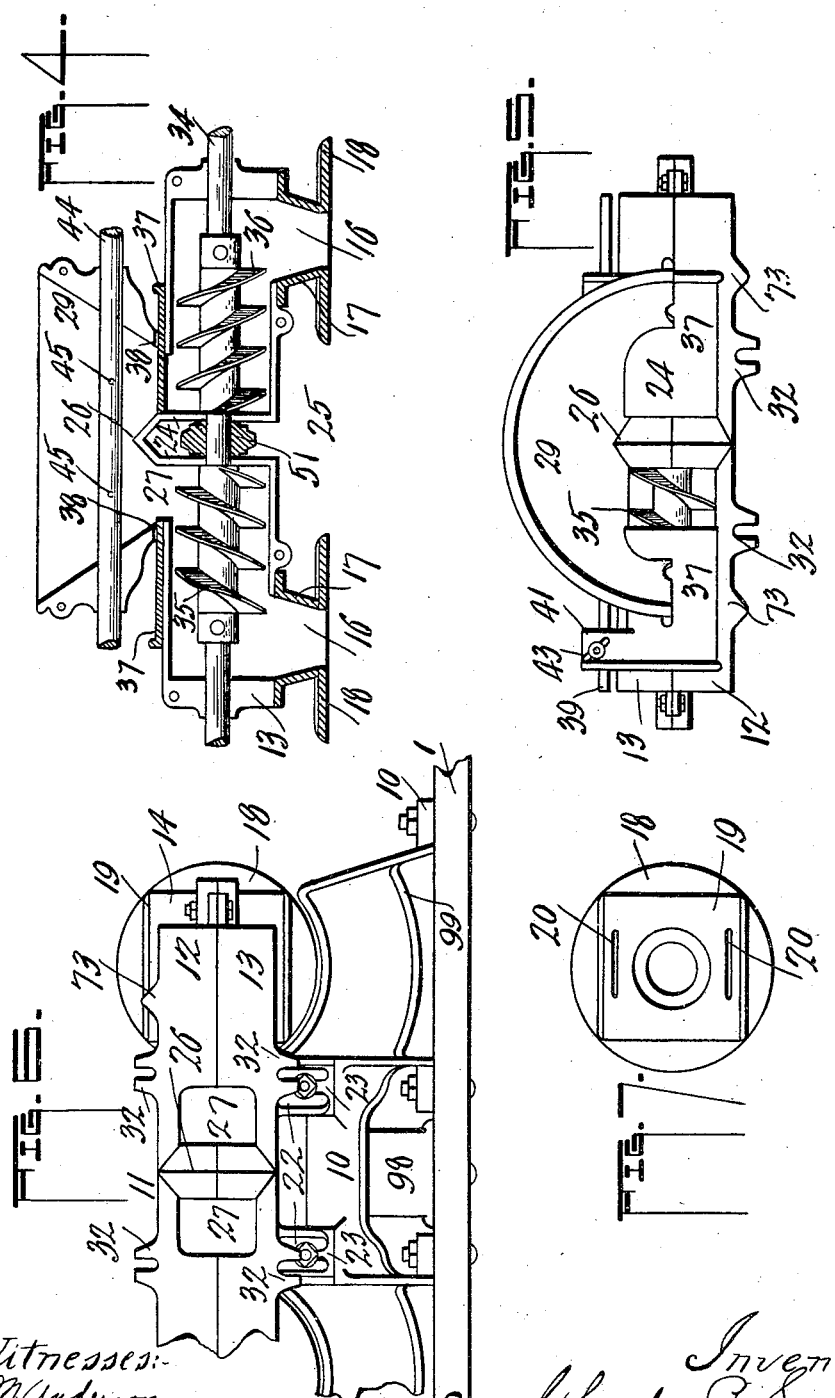

UNITED STATES PATENT OFFICE.

CHARLES P. SESTER, OF PEORIA, ILLINOIS.

SEEDING-MACHINE.

No. 860,610.          Specification of Letters Patent.          Patented July 16, 1907.

Original application filed September 27, 1905, Serial No. 280,249. Divided and this application filed February 8, 1906.
Serial No. 300,165.

*To all whom it may concern:*

Be it known that I, CHARLES P. SESTER, a citizen of the United States, residing at Peoria, in the county of Peoria and State of Illinois, have invented certain new and useful Improvements in Seeding-Machines; and I do hereby declare that the following is a full, clear, and exact description of the invention, which will enable others skilled in the art to which it appertains to make and use the same.
This invention has reference to certain new and useful improvements in seeding machines and has particular reference to the general type of broad cast distributers wherein two distributing fans are employed for receiving and distributing broadcast suitable seed or grain.

One of the objects of the present invention is combining two fan distributers and a force feed consisting of a right and left auger or screw adapted to receive and deliver grain from a central hopper to both of said distributers.

One of the objects of the invention is combining with two broadcast distributers a right and left auger or screw feed revolubly mounted in a suitable casing and communicating with a hopper adapted to contain grain; and a grass seed attachment containing a suitable feed and provided with diverging spouts from the feed, which at their lower ends communicate with the opposite ends of the casing containing such auger feed.

A further object of the invention is combining with two fan distributers, a feed consisting of a right and left auger, a driving shaft, driving connections between the said shaft and the fan distributers, and a chain drive between the said driving shaft and the auger shaft, which said chain drive is located intermediate said right and left auger feed.

A further object of the invention, is combining with two fan distributers a feed consisting of a right and left auger, a casing for containing the said auger and adjustable feed ways attached to the ends of said casing;
and to a grass seed attachment having diverging spouts connected at their lower ends with the opposite ends of the auger casing at points above the feed ways aforesaid.

The invention has for its further object a hopper to which is attached a suitable cylindrical casing provided with a central open chamber; a right and left auger feed disposed in opposite ends of such casing and revolubly mounted on a shaft passing through the same, slide valves for controlling inlet of grain to those portions of the casing containing said right and left augers, a driving shaft and a chain connecting the driving shaft with the auger shaft in the central chamber of the casing aforesaid; a grass seed attachment containing a suitable feed, and diverging spouts extending from the said feed to points at or near the opposite ends of the auger feed; a pair of fan distributers, one disposed beneath each end of the casing containing the auger feed, and adjustable feed ways supported on the opposite ends of said casing above said distributers.

This application is a division of the application filed by me on September 27th 1905, for improvements in seeding machines bearing Serial Number 280,249.

For a further and full description of the invention herein and the merits thereof, and also to acquire a knowledge of the details of construction of the means for effecting the result, reference is had to the following description and drawings hereto attached.

While the essential and characteristic features of the invention are susceptible of modification, still the preferred embodiment of the invention is illustrated in the accompanying drawings, in which;—

Figure 1, is a front elevation of a broadcast distributing machine containing my improvements; Fig. 2 is a side elevation of one side of my improvement but showing the drive shaft in cross section and omitting the driving means for the grass seed attachment, which said driving means is shown in dotted lines; Fig. 3 is a central vertical section through the upper portion of my distributing machine; Fig. 4 is a central longitudinal section taken through the cylindrical casing containing the right and left auger feed and also showing the adjustable feed ways attached to such casing; Fig. 5 is a plan view of the upper portion of my said improvement, particularly the cylindrical casing containing the right and left augur feed, the slide valves, one of which is here shown open, and one-half section closed of the superposed hopper above the said casing; Fig. 6 is a partial plan view of a supporting frame or casting which is secured to an end gate and showing the manner of adjustably attaching the cylindrical casing containing the augers thereto; Fig. 7 is a detached view in plan of one of the adjustable feed ways which is attached to the cylindrical casing containing the right and left auger, and which is disposed above the fan distributer; Fig. 8 is a longitudinal section, enlarged, of the fluted feeding roller for the grass seed attachment; Fig. 9 is an end view of the fluted feed roller of the grass seed attachment; Fig. 10 is a cross section through the grass seed attachment, showing the fluted roller, one of the slide valves and one of the feed spouts attached thereto; Fig. 11 is a detail rear elevation of parts of the casing of the machine showing the manner of supporting and adjusting the slide valves above the auger feed; Fig. 12 is an enlarged side elevation of an adjustable chain tightener which is employed in connection with the driving shaft for the driving chain from the said shaft to the gear carried by one of the wagon wheels.

Like numerals of reference indicate corresponding parts throughout the figures.

In the drawings 1 denotes an end gate, which is of the usual form to which is secured a pair of brackets 2 duplicates of each other and a bracket 3. In the brackets last referred to is journaled a drive shaft 4, while in the brackets 2 is journaled the short vertical shafts 5 on the upper ends of which are carried the fan distributers 6. The said fan distributers are provided with the ordinary shaped wings 7, but which stop short of the center of said distributers substantially as shown in the drawings.

The shaft 4 is shown supported in the usual manner from the ground wheel of a wagon, not shown, on which the said seed distributer is supported. And I have shown as a means of transmitting power from the shaft 4 to the shafts 5 bevel gears 8 on the shaft 4 in mesh with the pinions 9 on the shafts 5; although any other suitable gearing such as gears with spiral teeth or friction gears may be substituted.

10 denotes a combined bracket support and a distributer shield. Laterally adjustable on the support 10 is a substantially circular and elongated casing 11 composed of the semicircular sections 12 and 13, having webbed portions at their opposite ends by means of which they may be suitably connected together, and the lower portions of said castings at their opposite ends are provided with flange portions 14, which have secured thereto the feed ways 15 which communicate with openings 16 in the said casing 11. The feed ways 15 consist of short tapered and tubular necks 17 having the lower annular flange or shield 18 and the upper substantially squared flange 19 by means of which the said feed ways may be connected to the flanges 14 of the sections 12 and 13 of the casing 11. To adapt the feed ways 15 to be longitudinally adjusted on the sections of the casing 11, I provide the flanges 19 of the feed ways 15 with the elongated slots 20 to adapt the feed ways to be shifted upon the loosening of bolts 21, which is the means here employed for connecting the feed ways to the casing 11 as described.

To adapt the casing 11 to be laterally adjusted on the support 10, I have provided a pair of slotted ears 22 adapted to rest upon and be secured to extensions 23 of the said support 10.

With the arrangement of the casing 11 and the feed ways 15 as above described, I am enabled, for purposes to be further set forth, to move the entire casing 11 towards or from the end gate 1 and also shift the feed ways 15 toward or from the center of the said casing 11.

Describing more fully the construction of the casing 11, the same is provided with a pair of central inner walls or partitions 24, separated from each other a suitable distance forming the open way 25, the said partitions 24 or inner walls having the upwardly inclined or united converging portions 26. When the sections 12 and 13 are connected the partitions 24 and converging portions 26 unite to form a general partition through the said casing 11 and an overhanging inclosure for the open way 25. For a short distance on each side of the partition or walls 24 the upper wall of the casing or the sections 12 and 13 thereof is provided with the rectangular cut out portions 27 forming a feed way to the interior casing 11.

Supported by the casing 11 is a hopper support 28 consisting of a pair of substantially similar sections or castings 29 having the upper matching web portions 30 by means of which they may be connected together, and the said sections overlie a portion of the casing 11 and are provided with slotted ears 31 by means of which they may be bolted or otherwise suitably secured to corresponding ears 32 of the sections 12 and 13 of the casing 11. As here shown the hopper support 28 tapers from its upper outer edge to the casing with which it communicates and supports the hopper 33.

Revolubly carried and longitudinally disposed in the casing 11 and passing through the partitions 24 therein is a shaft 34, and on this shaft is carried right and left augers 35 and 36 adapted to convey material which may be discharged into the casing 11 to the opposite ends of such casing, and discharge it out through the openings 16 therein, to and through the feed ways 15 onto the distributers 6 revolving there beneath. To control the flow of material from the hopper and the hopper support to the casing 11 through the openings 27 in the upper wall thereof, I have provided slide valves 37, which are longitudinally adjustable on the casing 11 for the purpose of closing either of the openings 27 in the casing 11, substantially as seen in Figs. 4 and 5; the said slide valves as will be understood operate through suitable slotted ways 38 in the walls of the sections of the hopper support 28. The said slide valves 37 are adapted to be adjustably and slidably carried on a longitudinal rod 39 which passes through ears 40 attached to the casing 11, more particularly seen in Fig. 11. The means employed for adjusting and securing the slide valves 37 is through the off sets 41 connected to half boxings 42 through the winged nuts and connecting bolts, referred to generally as 43, thus it will be seen that the quantity of material which is fed to the auger feed of the casing 11 is governed entirely through the adjustment of the slide of the valves 37, by means of which more or less material may be allowed to enter the casing 11 through the openings 27 described.

Journaled in the hopper support 28 is an agitating shaft 44, carrying the agitators 45 and such shaft is driven by means of a sprocket chain 46 engaging a sprocket pinion 47 on the shaft 34 and a sprocket pinion 48 on the outer end of such agitating shaft. And the mode of transmitting motion or power to the auger shaft 34 is by means of a chain drive 49 engaging a sprocket wheel 50 on the driving shaft 4, and passing up intermediate the two distributing fans 6 operates through the open way 25 of the casing 11 and engages a sprocket pinion 51 on the shaft 34 between the matching walls or partitions 24 of the said casing 11.

Operating the auger shaft in the manner in which I do, by means of a driving chain extending up intermediate the distributing fan, obviates the obstruction of the cast of grain or other material from the fan distributers, which would be the case if the drive were arranged to connect the outer end of either end of the auger shaft 34; and through the provision of the converging wall 26 of the partitions 24, I provide a shed or inclosure for the pinion 51 and the drive chain 49 and form a feed way together with the openings 27 in the casing 11 to adapt an easy flow of material from the hopper and its support to the interior of the casing 11. I have provided a guide and chain tightener for the driving chain 49, consisting of a sheave wheel 52, which is carried by a depending bracket 53 adjustably supported on the outer section 12 of the casing 11. The said bracket 53 has a concave face adapted to match the convex surface of the section 12, so that in the adjustment of said bracket and the sheave wheel thereon the said sheave wheel may be adjusted toward and from the chain. The upper end of the said bracket is slotted as at 54 to adapt it for adjustment when the bolt 55, which supports the same is loosened.

The devices, that is the feeding devices, which have been referred to are employed mainly for conveying grain, such as oats, wheat, etc., from a hopper to distributing fans for discharging it broadcast over a field. I will now described a grass seed attachment for conveying such seed from a hopper to the point in the casing 11 where the grain is discharged into a feed way from which it is deposited onto the fan distributers, at which point the grass seed and grain is mixed before its discharge onto the distributers.

56 refers generally to a hopper support consisting of the matching sections 57 suitably secured together through the ears 58. The said sections support a hopper 59 and are provided with ears 60 by means of which they may be bolted or otherwise suitably secured to one of the sections 29 of the hopper support 28, see Fig. 2. The sections of the hopper 56 are provided with an open way 61 controlled by oppositely movable valves 62, and extending through the said hopper support and journaled in the opposite walls thereof is a short shaft 63, on which is revolubly mounted a fluted force feed roller 64 and the drive for the said shafts 63 is through a sprocket chain 65 engaging a sprocket pinion 66 on the agitating shaft 44, and a sprocket pinion 67 carried on the shaft 63. See Fig. 1, for a front elevation and Fig. 2 for a side elevation, however, in the latter view the drive is shown in dotted lines.

Referring to the force feed roller 64, the same is provided with oppositely projected fluted portions 68 divided by a central flange or partition 69. The flutes of the fluted portion 68 taper downwardly from the flange portion 69 to the outer ends of the said roller and the outer ends of the flutes are flared, or in other words the walls of the flutes converge from their greatest width which is at the ends of the roller to the central flange or partition thereof where they are in very close proximity to each other; it is preferable to have the flutes substantially semi-circular or concave as shown in Figs. 9 and 10. The object of providing a fluted force feed roller where the flutes thereof taper from a central point downwardly and outwardly to the ends of the said rolller is to gradually increase the feed of material from the hopper through the force feed roller to the feeding devices heretofore described. The feed of the material being regulated by the adjustment of the slide valves 62, which, if moved outwardly a short distance will allow a small quantity of material to be discharged by the fluted roller and as the slide valves are moved further outwardly it will be seen that the flow of material will rapidly increase, owing not only to the openings of the valves but through the exposure of the flutes, the widths and depths of which increase toward their outer ends. The slide valves 62 are slotted as at 70 and move adjacent to bracket 71 extending out from the sections 57 of the hopper support 56 through which the shaft 63 is carried and the same are adjustably held by means of the winged nuts and bolts referred to generally as 71$^a$.

Attached to the hopper support 56 is a pair of depending and diverging spouts 72, preferably tapered as shown in the drawings and having their lower ends seated in the tubular bosses 73 projecting out from the sections 12 of the casing 11, at or near their opposite ends, and preferably at points where material is conveyed through the tubes 72 will be discharged above the feed ways 15, of the openings 16 in the casing 11 to insure the commingling of the grass seed and grain. The upper ends of the spouts 72 are secured in position to receive seed from the hoppers 56, when the slide valves 62 are open, by means of ears 74 which are adapted to ears 75 forming a part of the hopper support sections 57. The upper ends of the spouts 72 where they unite are provided with matching walls 76 which lie in juxtaposition with each other, and have the extending ears 77, which are bolted together as shown at 78.

The object of adjusting the casing 11 on its support or the feed ways 15 on the said casing, is to regulate the feed of grain and grass seed onto the fan distributers. If it is found that the cast of the material from the distributers is too much to one side or the other, then the feed ways 15 will be adjusted longitudinally of the casing 11. If the cast of the material is too near the board, then the casing 11 should be properly adjusted transversely on the support 10. By this means I am enabled to discharge the material onto the distributers at desired points and also regulate the cast from such distributers, and for this purpose, I prefer to employ fan distributers having wings substantially as here shown.

On the outer end of the driving shaft 4, is carried the usual pinion 79, which is driven by means of a sprocket chain 80, from a driving sprocket (not shown) attached to the axle or one of the ground wheels of a wagon (not shown). The sprocket pinion 79 is provided with the usual clutch faces 81 adapted to have engagement with any well known form of clutch mechanism 82. The pinion 79 is slidable on the shaft 4, and is provided with the grooved sleeve 83. I will now describe the means of shifting the pinion 79 and its parts, and also an adjustable chain tightener and guide for the chain 80.

84 denotes a reciprocal rod which is slidably carried through the bracket 3 and on its outer end has fixedly attached thereto arms 85 and 86, with portions engaging the grooved sleeve 85. It will be seen that upon shifting the rods 84 longitudinal movement may also be imparted to the sprocket pinion 79 through the engagement of the arms 85 and 86 with the grooved sleeve thereof. To accomplish this movement, I provide a lever 87 pivoted at 88 to the board 1, its lower end being suitably connected to the rod 84. And for the purpose of locking the position of the lever 87, when once shifted, I provide the oscillating rod 89, pivoted to a bracket 90 secured to the board 1, the free end of the rod passing loosely through a plate 91 between which and an upper shoulder portion 92 is coiled a spring 93. Thus it will be seen upon shifting the lever 87 across the pivot of the rod 89 through the action of the spring 93, it will throw the rod into a position to lock the lever, against accidental displacement through the vibration or jar of the wagon.

94 denotes a sheave wheel over which it is adapted to carry the chain 80 and the same is carried by an arm 95 secured by a bolt 96 to an ear 97 of the arm 86. The connection of the arm 95 with the ear 97 is through a boss on the said ear 97 which has a serrated face matching a corresponding serrated face on the end of the arm 95. Thus with the loosening of the bolt 96 the serrated faces of the arm 95 and the ear 97 may be separated and the arm 95 swung into a desirable position and again locked, the serrated faces preventing the release or undue oscillation of the arm 95 through the vibration or the movement of the wagon.

As a supplemental support for the support 10 and the parts carried thereby, I have provided the brace 98 as shown.

The bracket support 10 was referred to as a support and distributer shield, the shield portion being indicated as 99 and of substantially semi-circular shape depending from the support 10 at the rear of the distributers.

Having thus fully described my invention, what I claim and desire to secure by Letters Patent of the United States, is:—

1. In a seeding machine, the combination of a removable end-gate for vehicles, two distributing fans supported from said endgate, a force feed also supported from said endgate for delivering material to said distributers, a driving shaft for actuating said distributers and driving connections between said shaft and the force feed the same operating intermediate the said distributers.

2. In a seeding machine, the combination of a casing, provided with a plurality of discharge openings, feed ways detachably connected with said casing and coinciding with its discharge openings, and a force feed mechanism contained within said casing.

3. In a seeding machine, the combination of a casing provided with discharge openings, adjustable feed ways connected with said casing and adapted to co-incide with the openings therein, and a force feed mechanism contained within said casing.

4. In a seeding machine, the combination with a support, an elongated casing adjustable on said support, adjustable feed ways connected with the opposite ends of the casing, and a force feed mechanism contained within said casing.

5. In a seeding machine, the combination with a support, a casing adjustably carried on said support and provided with discharge openings at its opposite ends, feed ways longitudinally adjustable on said casing and beneath the openings therein, and a force feed mechanism contained within said casing and adapted to deliver material to the openings in the opposite ends thereof.

6. In a seeding machine, the combination of a casing provided with discharge openings at its opposite ends and having openings near the center thereof to provide for the delivery of material thereto, feedways connected with the said casing and adapted to co-incide with the discharge openings thereof, a force feed mechanism operating in said casing and adapted to deliver material to the discharge openings therein, and slide valves for covering the openings in the casing through which is fed material delivered thereto.

7. In a seeding machine, the combination of a casing, a force feed having right and left operating portions within said casing, means for delivering material to the casing, a grass seed attachment, force feed mechanism therein, diverging spouts from the said attachment leading to and connected with the opposite ends of the said casing, and a distributing fan revolubly mounted beneath the opposite ends of the casing.

8. In a seeding machine, the combination of two distributing fans, force feeding devices adapted to deliver material to each of said fans, a grass seed attachment, force feeding devices therein, a pair of diverging spouts leading from the said attachment and connected with the force feeding devices, and means for controlling the delivery of material from the force feeding devices of the said attachment to the said spouts.

9. In a seeding machine, the combination of a pair of distributing fans, a seed containing hopper, force feeding devices for delivering seed from the said hopper to the said fans, a supplemental seeding attachment, force feeding devices therein and a pair of spouts connected with said supplemental attachment and diverging downwardly, inwardly and outwardly connect with the said first mentioned force feeding devices.

10. In a seeding machine, the combination of a pair of distributing fans, a casing disposed above the fans and provided with discharge openings, a right and left force feeding device for conveying material delivered to the casing to the discharge openings therein, a driving shaft, connections between the said shaft and the said fans, a driving chain connecting the shaft with the said force feeding device, the said chain extending vertically between the fans aforesaid, and a chain tightener and guide adjustably supported on said casing.

11. In a seeding machine, the combination with a support, of a casing consisting of two half sections suitably secured together and supported by said support, feed ways adjustably connected with the opposite ends of said casing and depending therefrom, a distributing fan revolubly mounted, beneath each feed way, a force feeding device in said casing adapted to deliver material to the opposite ends thereof to be discharged through the feed ways aforesaid, and means for regulating the delivery of material to said casing.

12. In a seeding machine, the combination with a support, of a casing consisting of two half sections suitably secured together and adjustably mounted on said support, feed ways adjustably connected with the opposite ends of said casing and depending therefrom, a distributing fan revolubly mounted beneath each feedway, a force feeding device in said casing adapted to deliver material to the opposite ends thereof to be discharged to the feed ways aforesaid, means for regulating the delivery of material, and mechanism common to the said fans and force feeding device for actuating the same.

In testimony whereof I affix my signature, in presence of two witnesses.

CHARLES P. SESTER.

Witnesses:
 CHAS. N. LA PORTE,
 ROBT. N. MCCORMICK.